United States Patent
Sacher

(10) Patent No.: US 9,118,263 B2
(45) Date of Patent: Aug. 25, 2015

(54) PIEZO MOTOR

(75) Inventor: Friedrich-Josef Sacher, Troisdorf (DE)

(73) Assignee: Aspre AG, Appenzell (CH)

( * ) Notice: Subject to any disclaimer, the term of this patent is extended or adjusted under 35 U.S.C. 154(b) by 369 days.

(21) Appl. No.: 13/817,840

(22) PCT Filed: Aug. 11, 2011

(86) PCT No.: PCT/EP2011/004013
§ 371 (c)(1),
(2), (4) Date: Feb. 20, 2013

(87) PCT Pub. No.: WO2012/022443
PCT Pub. Date: Feb. 23, 2012

(65) Prior Publication Data
US 2013/0147315 A1 Jun. 13, 2013

(30) Foreign Application Priority Data
Aug. 20, 2010 (DE) .......................... 10 2010 035 045

(51) Int. Cl.
*H01L 41/09* (2006.01)
*H02N 2/00* (2006.01)
*H02N 2/10* (2006.01)

(52) U.S. Cl.
CPC ..................... *H02N 2/101* (2013.01)

(58) Field of Classification Search
USPC ............ 310/323.01, 323.02, 323.08, 323.09, 310/323.17, 328
See application file for complete search history.

(56) References Cited

U.S. PATENT DOCUMENTS

| 4,453,103 | A | * | 6/1984 | Vishnevsky et al. ..... 310/323.02 |
| 5,780,956 | A |   | 7/1998 | Oliver et al. |
| 7,187,103 | B2 |   | 3/2007 | Witteveen |
| 2001/0011860 | A1 |   | 8/2001 | Dettmann et al. |
| 2003/0052575 | A1 |   | 3/2003 | Mock |
| 2004/0140736 | A1 |   | 7/2004 | Richter |
| 2008/0001498 | A1 |   | 1/2008 | Muller |
| 2008/0238247 | A1 |   | 10/2008 | Richter |
| 2008/0247059 | A1 | * | 10/2008 | Dong ............................ 359/696 |
| 2008/0297002 | A1 | * | 12/2008 | Oki et al. ................. 310/323.16 |

FOREIGN PATENT DOCUMENTS

| CN | 101267169 A | 9/2008 | |
| CN | 101499738 A | 8/2009 | |
| DE | 41 27 163 A1 | 2/1993 | |
| DE | 4244704 A1 * | 3/1994 | ............... H02N 2/00 |
| DE | 94 19 802 U1 | 5/1996 | |
| DE | 101 27 444 A1 | 4/2002 | |
| DE | 101 17 465 A1 | 10/2002 | |

(Continued)

*Primary Examiner* — Thomas Dougherty
(74) *Attorney, Agent, or Firm* — Muirhead and Saturnelli, LLC

(57) ABSTRACT

A piezo motor has a stator and a rotor as well as a drive finger which is held by the stator, drives the rotor and interacts with at least one piezo element. In order to improve the force transmission, the free end of the drive finger moves a driver jaw, which can be pressed against a ring surface of the rotor. The free end of the drive finger is held such that it can move in the longitudinal direction between two stops on the driver jaw, and the driver jaw can be pressed against the rotor, in time with the drive movement of the drive finger, by at least one piezo actuator during the drive movement of the drive finger, and can be pivoted in the drive direction and back about the rotor axis, together with the piezo actuator, corresponding to the magnitude of a deflection of the drive finger.

20 Claims, 5 Drawing Sheets

(56) References Cited

FOREIGN PATENT DOCUMENTS

| | | |
|---|---|---|
| DE | 10 2006 004 194 B3 | 5/2007 |
| EP | 0 552 346 B1 | 4/1997 |
| EP | 0 951 078 A1 | 10/1999 |
| EP | 1 192 704 B1 | 10/2006 |
| EP | 1 746 668 A2 | 1/2007 |
| JP | 61-22776 | 1/1986 |
| WO | WO 94/07271 | 3/1994 |
| WO | WO 01/41228 A1 | 6/2001 |
| WO | WO 2007/068441 A1 | 6/2007 |

* cited by examiner

PIEZO MOTOR

TECHNICAL FIELD

This application relates to a piezo motor having a stator and a rotor and at least one drive finger which is held by the stator, drives the rotor and interacts with at least one piezo element. The rotor can rotate about the stator which is secured by a stator axle. This rotor has a hollow-cylindrical annular face on which the drive finger acts. However, the rotor can also be arranged next to the stator, and the drive finger which is held at one end by the stator acts on a cylindrical annular face of the rotor.

BACKGROUND OF THE INVENTION

Piezo motors of this type are known from the following documents: DE 10 2006 004 194; EP 0 951 078; WO 01/41228; and EP 1 192 704.

In these piezo motors, electrical oscillations are converted into mechanical oscillations by means of the reciprocal piezo effect, and these mechanical oscillations of a drive finger are used to drive a rotor. Even if the deflections of the drive finger are very small, a sufficiently high rotational speed of the rotor is achieved owing to the high speed of these deflections.

In the known piezo motors, the drive finger is formed by a resonance body which is made to oscillate by an oscillation generator made of a piezo-electric material. The oscillating end of the drive finger is pressed against an annular face of a rotor by a spring device, and as a result a frictional contact is brought about.

The frictional contact of the drive finger with the rotor has the disadvantage that the oscillating contact face of the drive finger wears relatively quickly and the component which runs in the drive direction is not fully utilized. In addition, only very small forces can be transmitted from the drive finger to the rotor.

Accordingly, it would be desirable to provide a piezo motor in which the transmission of force from the drive finger to the rotor is improved.

SUMMARY OF THE INVENTION

According to the system described herein, a piezo motor includes a drive finger that moves, with its free end, a driver jaw which can be pressed against an annular face of the rotor wherein the free end of the drive finger is held in a radially displaceable fashion between two stops of the driver jaw, and during the drive movement of the drive finger the driver jaw can be pressed against the rotor by at least one piezo actuator in time with the drive movement of the drive finger, and can be pivoted in the drive direction and back about the rotor axis, together with the piezo actuator, in accordance with the magnitude of a deflection of the drive finger.

In this piezo motor, the oscillations of the drive finger are taken up by a driver jaw which is pressed against a hollow cylindrical or cylindrical annular face of the rotor by a further piezo actuator in time with the oscillation of the drive finger. As a result, slip losses are largely avoided and relatively large forces can also be transmitted from the drive finger to the rotor via the driver.

The contact face of the driver jaw is relatively large and constructed in such a way that a good frictional connection comes about between the rotor and the driver jaw.

The free end of the drive finger is held between the stops of the driver jaw in such a way that the free end can move in the longitudinal direction of the drive finger and at a right angle thereto. The free end of the drive finger can then not only oscillate in the drive direction and back but also in a circle or in an oval.

The drive finger can be formed as a bending piezo which is non-rotatably held with its fixed end in the stator, is coated with piezo crystals on one side or on both sides and can be bent on one or two sides, and is partially composed of an elastic material which serves as a resetting spring.

However, the drive finger can also be held with its fixed end on the stator in such a way that it can pivot about the rotor axis, and can be made to oscillate by a stack actuator and a resetting spring or a second stack actuator.

Two or more driver jaws which are moved by drive fingers act on the rotor, the drive piezos and pressing piezo actuators of said driver jaws acting on the rotor with the same frequency and with an at least partial phase offset.

BRIEF DESCRIPTION OF THE DRAWINGS

In the following description, exemplary embodiments of the invention are described in more detail with reference to the drawings, in which.

DETAILED DESCRIPTION OF VARIOUS EMBODIMENTS

Figure 1:
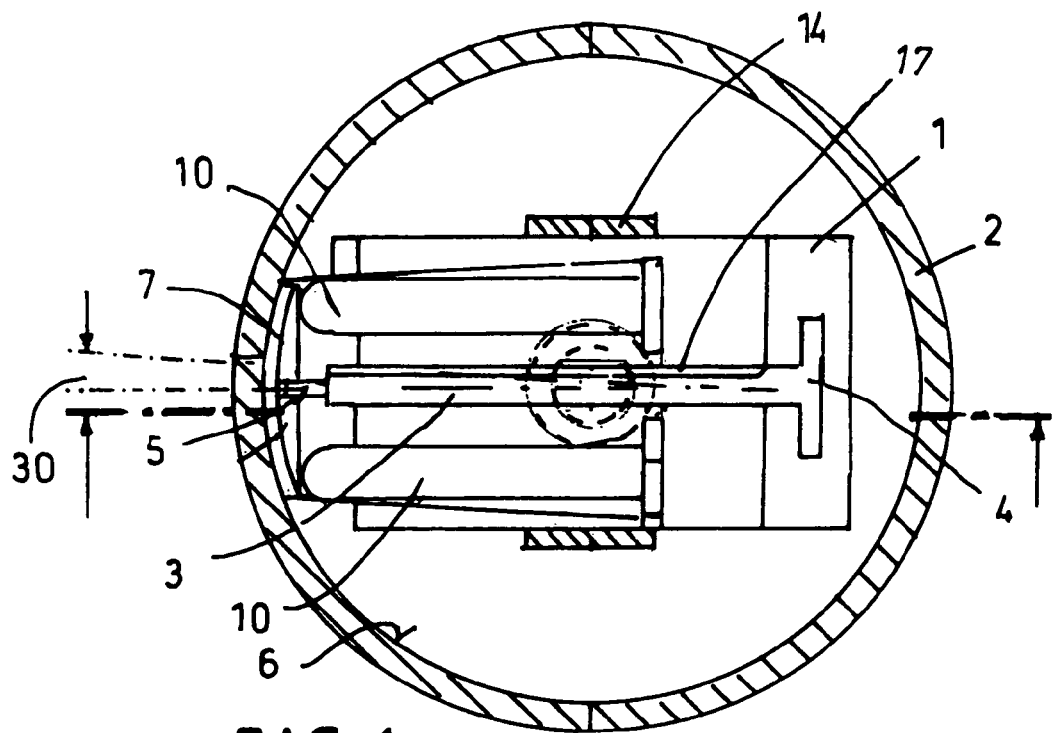
FIG. 1 shows a sectional view of a piezo motor according to the sectional lines I-I in FIG. 2
Figure 2:
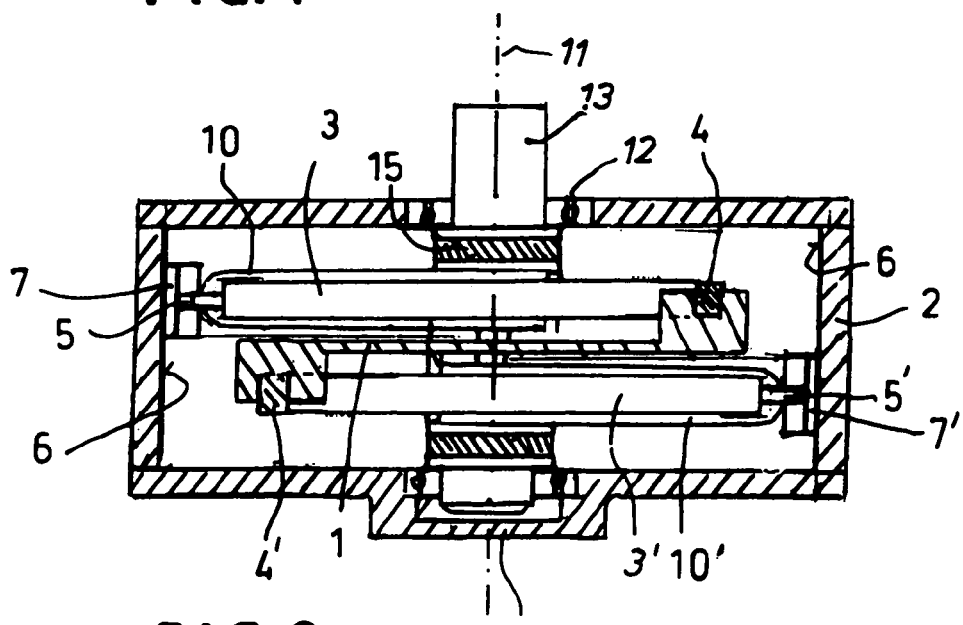
FIG. 2 shows a sectional view of the piezo motor according to FIG. 1 according to the sectional lines II-II in FIG. 1.

The piezo motor according to FIGS. 1 and 2 has a stator 1 and a rotor 2 which can rotate about the axis 11 and is driven by a drive finger 3. The drive finger 3 has a fixed end 4 which is held by the stator 1, and a free moveable end 5. The drive finger 3 interacts with at least one piezo element 17 which moves the free end 5 of the drive finger 3 in a drive direction. The free end 5 of the drive finger 3 is held such that it is radially displaceable between two stops 8 and 9 of a driver jaw 7 which, during the drive movement of the drive finger 3, is pressed against the annular face 6 of the rotor 2 by at least one piezo actuator 10 which changes its length under voltage. The piezo actuator 10 which presses the driver jaw 7 against the rotor 2 may be, for example, a piezo stack actuator.

The face of the driver jaw 7 which comes into contact with the rotor 2 is such that in the case of abutment a good frictional connection with the rotor 2 comes about. Because the driver jaw 7 pivots with the rotor 2 about the axis 11 during the drive phase, the driver jaw 7 must also be pivotable, together with its piezo actuator 10, about the rotor axis 11. The driving piezo element 17 and the pressing piezo actuator 10 operate with the same frequency and with the same timing with the result that at the end of the drive movement the contact of the driver jaw 7 to the rotor 2 is eliminated and the drive finger 3 quickly moves back into the home position together with the driver jaw 7, and a new drive step can begin. The quick return movement of the drive finger 3 can take place on the basis of the material property and elasticity of the drive finger 3 or else also by means of a further piezo actuator which operates with the same frequency but with a phase offset. The lifting off of the driver jaw 7 from the annular face 6 can take place with the aid of a resetting spring.

The free end 5 of the drive finger 3 can also be held between the stops 8 and 9 of the driver jaw 7 such that it is displaceable not only in the longitudinal direction of the drive finger 3 but also at a right angle thereto and at a right angle to the drive direction, with the result that the free end 5 of the drive finger 3 can also carry out oval movements.

The drive finger 3 advantageously operates as a resonator which is excited to oscillate at its natural frequency by piezo crystals. The oscillations can occur in the drive direction and back or else also in accordance with an elliptical path or circular path.

The piezo crystals 17 are arranged on one side of the drive finger 3 with the result that under voltage the drive finger bends toward this side and in the process entrains the driver jaw 7. Because at the end of this movement the driver jaw 7 ceases its contact with the hollow cylindrical annular face 6 of the rotor 2, the drive finger 3 jumps back with the driver jaw 7, into the home position. The drive finger 3 can also be coated on both sides with piezo crystals, with the result that the rotor 2 can rotate both in the clockwise direction and in the counterclockwise direction if in each case only one side of the drive finger 3 is connected to voltage, and the drive finger 3 bends to the left or the right.

In order to bring about better synchronicity of the rotor 2 and a higher power of the piezo motor, two or more drive fingers, and driver jaws cooperating therewith, act on the rotor 2.

As is shown by FIG. 2, drive fingers 3, 3' which interact with the driver jaws 7, 7' are arranged on both sides of a disk-shaped stator 1. The drive fingers 3, 3' and the driver jaws 7, 7' operate at the same frequency but offset by half a wavelength or phase. In the case of three drive fingers with driver jaws, the phase offset should be a third of a phase and in the case of four drive fingers with driver jaws it should be a quarter of a wavelength or phase.

Figure 3:
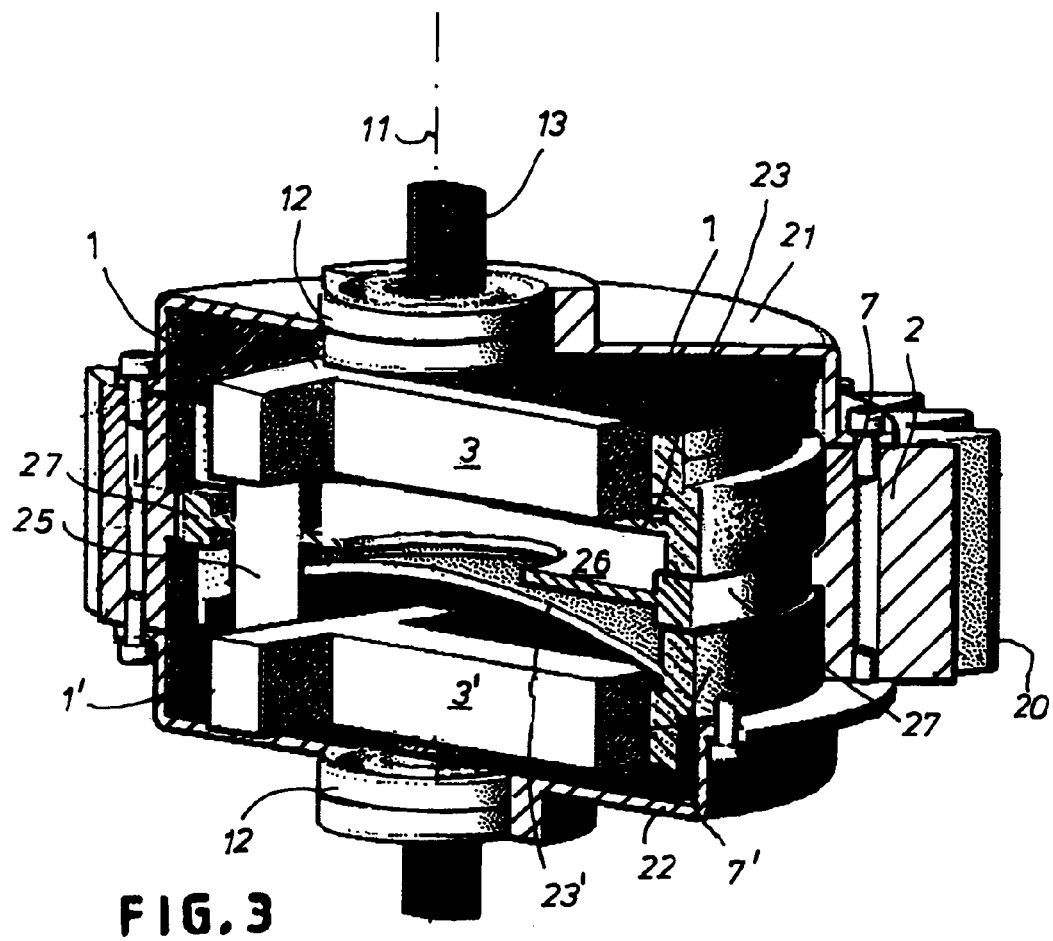
FIG. 3 shows a perspective sectional view of a further embodiment of a piezo motor.
Figure 4:
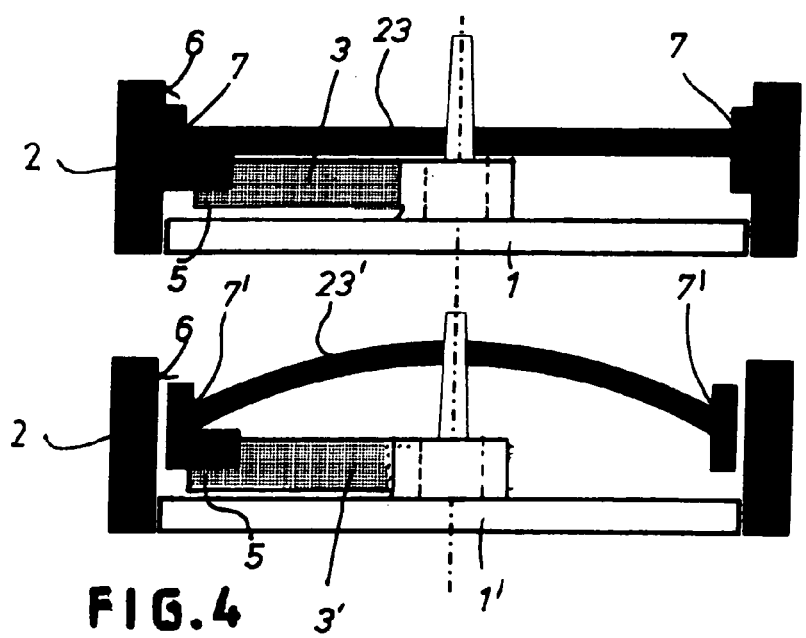
FIG. 4 shows a basic illustration.
Figure 5:
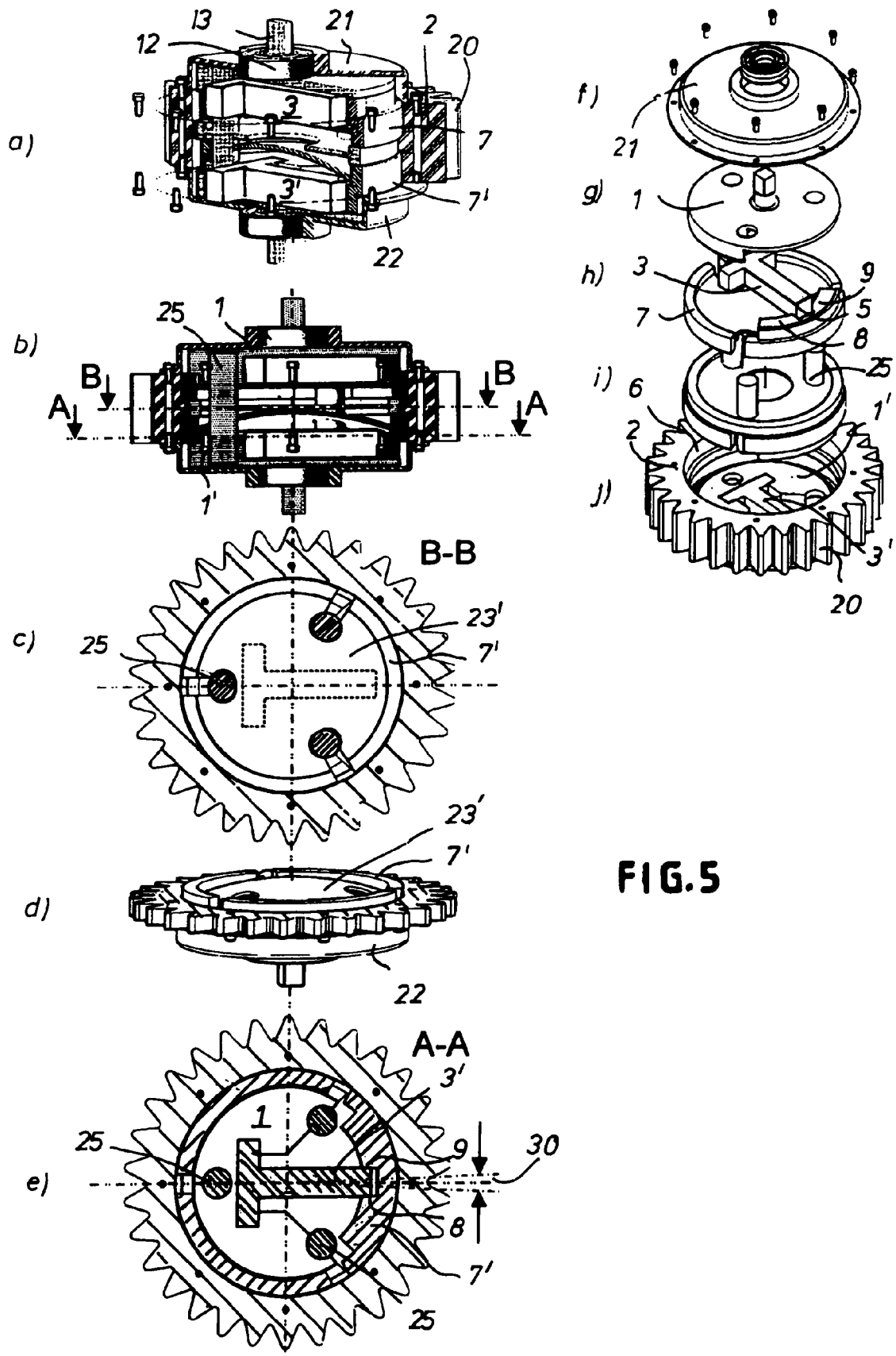
FIG. 5 shows an exploded illustration of the piezo motor according to FIG. 3.

In the case of the embodiment of a piezo motor according to FIGS. 3 to 5, the method of operation is in line with the piezo motor according to FIGS. 1 and 2. The parts which act in the same way are provided with the same reference symbols. The rotor 2 surrounds the stator 1 on the housing side and is mounted so as to rotate about a fixed stator axle 13 by means of two housing covers 21, 22 and by means of roller bearings 12. The stator 1 has at least one drive finger 3 which acts, with at least one driver jaw 7, on a hollow-cylindrical annular face 6 of the rotor 2. The stator is composed of an upper stator disk 1 which is permanently connected to the fixed stator axle 13 and in which the fixed end 4 of the drive finger 3 is held, and of a lower stator disk 1' in which the fixed end 4' of the drive finger 3' is held. The two stator disks 1, 1' are rigidly connected to one another by means of bolts 25.

In this embodiment, the driver jaws 7, 7' are pressed by one piezo curving disk 23, 23' each against the inner face 6 of the rotor 2 when the drive fingers 3, 3' make a movement in the drive direction with their free ends 5, 5'. The piezo curving disks 23, 23' have, on one side, a layer of piezo crystals which cause the disks to curve when voltage is applied. In the process, the circumference of the disks 23, 23' decreases. If the disks 23, 23' are without voltage, they are flat and have a relatively large circumference, with the result that the driver jaws 7, 7' are pressed against the rotor 2.

In FIG. 3, a fixed intermediate disk 26, which has a sliding ring 27 against which the driver jaws 7 and 7' bear, is arranged between the upper and the lower driver jaws 7, 7'.

In the basic illustration according to FIG. 4, the drive finger 3 interacts with the driver jaw 7, and the drive finger 3' interacts with the driver jaw 7'. The piezo curving disks 23, 23' are connected rigidly, and if appropriate in one piece, to the associated driver jaws 7, 7'. The piezo curving disk 23 of the upper drive finger 3 is without voltage and lies flat in one plane with the result that the driver jaws 7 are pressed by the piezo curving disk 23 against the inner face 6 of the rotor 2. At the same time, the piezo curving disk 23' of the lower drive finger 3' is under voltage, as a result of which this curving disk 23' curves, its circumference decreases and the driver jaw 7' becomes detached from the rotor 2.

FIG. 5 with the individual drawings a), b), c), d), e), f), g), h), i) and j) shows individual parts of the piezo motor according to the system described herein in a comprehensive overview.

FIG. 5 *a*) is a smaller version of FIG. 3.

FIG. 5 *b*) shows a sectional view of the piezo motor with a section parallel to the rotor axis 11 and parallel to the drive fingers 3, 3'.

FIG. 5 *c*) shows a view along the sectional line B-B in FIG. 5 *b*) of the piezo curving disk 23 with the driver jaws 7 and the connecting bolt 25 of the stator 1.

FIG. 5 *d*) shows a perspective view of the part according to FIG. 5 *c*).

FIG. 5 *e*) shows a view along the sectional line A-A in FIG. 5 *b*) with a plan view of the lower stator disk 1', the lower drive finger 3' and the lower driver jaws 7' with the stops 8, 9 between which the free end 5 of the drive finger 3' is held in a longitudinal displaceable fashion.

In addition, the size of a drive section 30, which comes about as a result of the bending deformation of the drive finger 3' is indicated.

FIG. 5 *f*) shows a perspective view of the upper housing cover 21 which can be screwed onto the rotor 2 or onto the gear wheel 20.

FIG. 5 *g*) shows a perspective view of the upper stator disk 1 with the stator axle 13.

FIG. 5 *h*) shows a perspective view of the upper drive finger 3 which is held with its free end 5 between the stops 8 and 9 of the driver jaw 7.

FIG. 5 *i*) shows a perspective view of the sliding ring 27, of the stator connecting bolts 25 and of the lower driver jaws 7'.

FIG. 5 *j*) shows a perspective view of the rotor 2 with its hollow-cylindrical face 6 and the lower stator disk 1' with the lower drive finger 3'.

Figure 6:
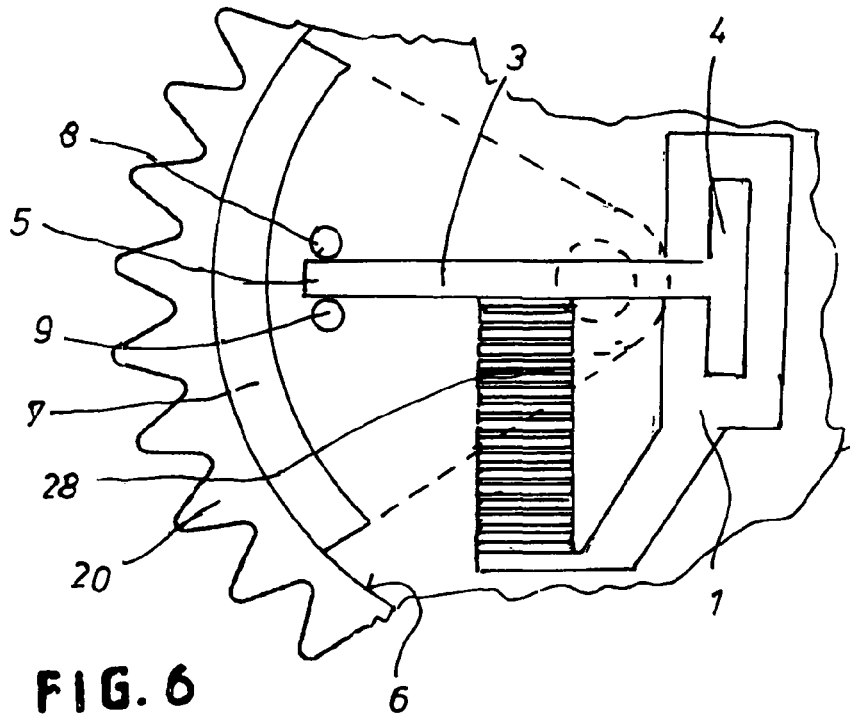
FIG. 6 shows a plan view of a drive finger driven by a stack piezo actuator.

FIG. 6 shows that the drive finger 3 is driven by a stack piezo actuator 28. The stack piezo actuator 28 can be arranged on one side of the drive finger 3 or else on both sides of the drive finger 3 in order to bend the drive finger 3 to one side or else bend to one side or to the other side, with the result that the rotor 2 is driven in the clockwise direction or in the counterclockwise direction. The stack piezo actuator 28 can be straight in the known fashion or else also be curved in the form of a circular arc in order to increase the number of piezo actuator disks, as is shown by FIGS. 7 and 8.

Figure 7:
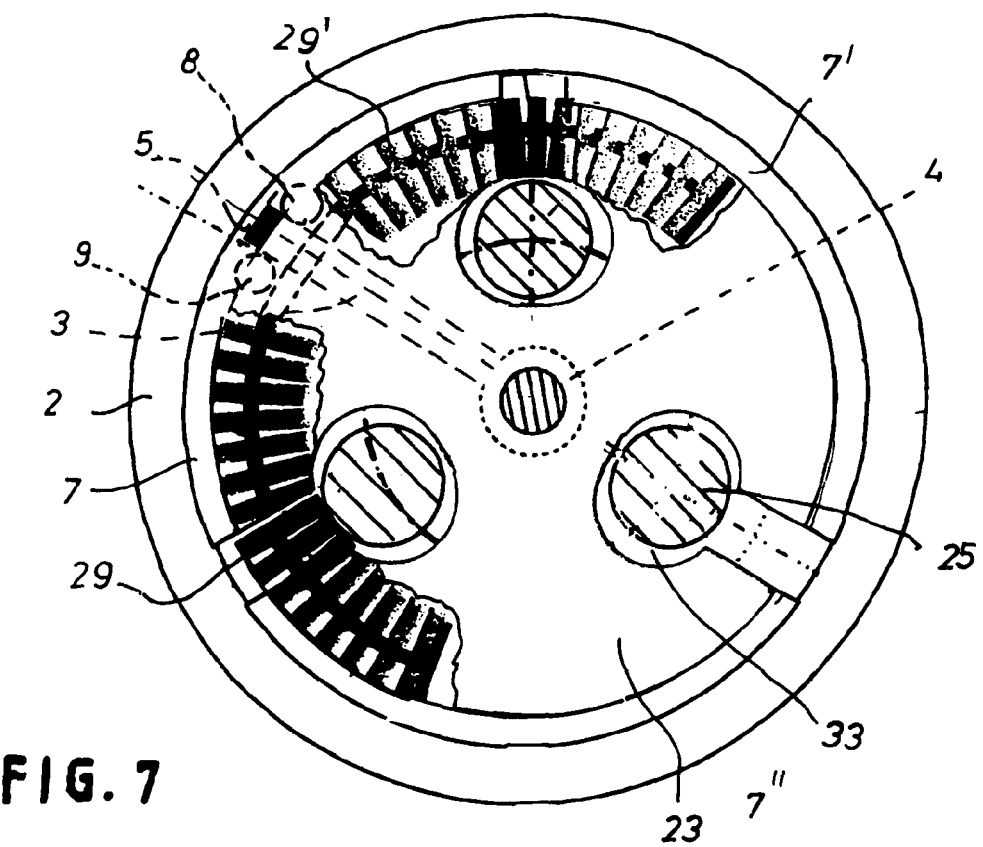
FIG. 7 shows a plan view of a piezo curving disk with driver jaws which are moved by a drive finger which is driven by stack piezo actuators arranged on both sides.
Figure 8:
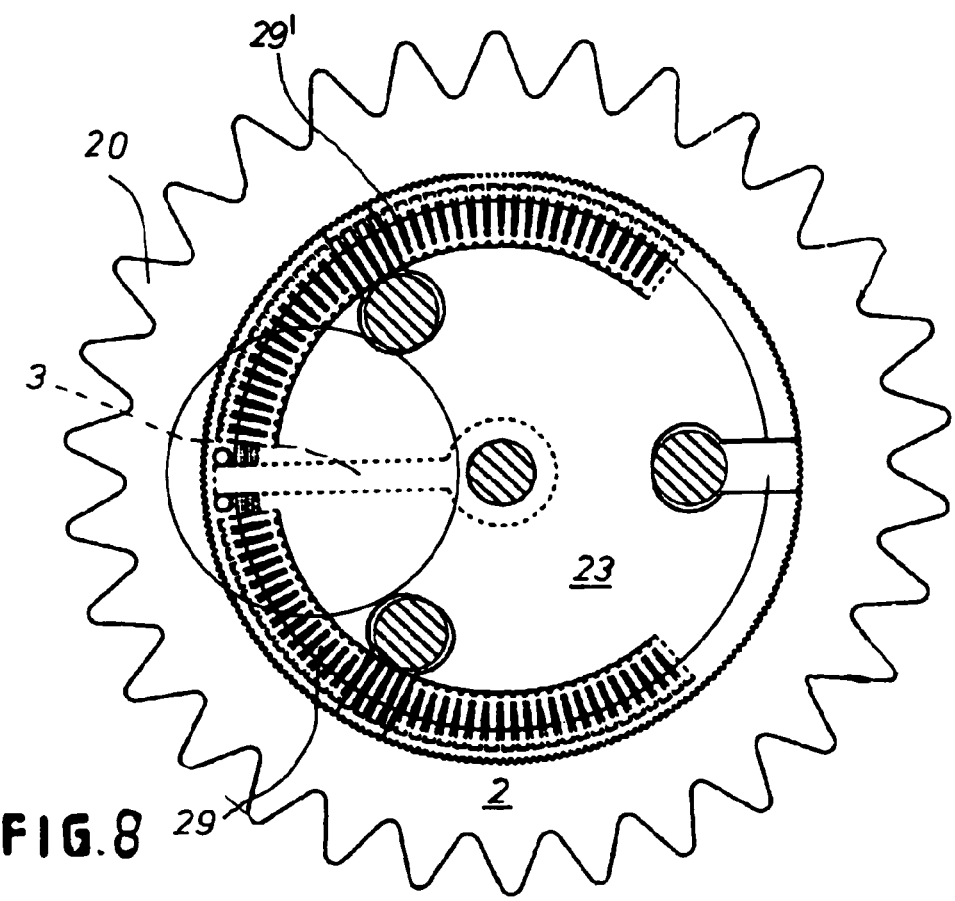
FIG. 8 shows a plan view corresponding to FIG. 7 in which the driver jaw and the inside of the rotor are provided with toothings.

FIG. 7 shows a plan view of three driver jaws 7, 7' and 7", which are held in abutment against the hollow-cylindrical annular face of the rotor 2 by a piezo curving disk 23 which is integrally connected to said driver jaws 7, 7' and 7". When voltage is applied, the piezo curving disk 23 curves, as a result of which its circumference decreases and the driver jaw 7 lifts off from the hollow-cylindrical face 6 of the rotor 2.

As is shown, in particular by FIG. 7, passage openings 33 for the bolts 25 which rigidly connect the disk-shaped parts of the stator 1 to one another are formed in the piezo curving disk 23. These passage openings 33 are shaped in such a way that the curving disk 23 can pivot at least by the magnitude of a deflection 30 relative to the bolts 25. In addition, these openings 33 are shaped and arranged in such a way that in the curved position the curving disk 23 bears against these three bolts and therefore centers itself with respect to the rotor axis 11. This ensures that the driver jaws 7, 7' lift off from the annular face 6 of the rotor 2 when the circumference of the curving disk 23 becomes smaller.

In FIGS. 1 to 5, the drive finger 3 is non-rotatably held with its fixed end 4 in the stator 1 and the deflection 30 occurs as a result of bending of the drive finger 3. The resetting of the drive finger takes place as a result of its elasticity.

In FIG. 7, the drive finger 3 is moved by a stack actuator 29 in the drive direction and by a second stack actuator 29' into the home position. In this case, the drive finger 3 is mounted at its fixed end 4 so as to be rotatable about the rotor axis. The oscillations of the drive finger 3 are generated by the stack actuators 29, 29'.

Figure 9:
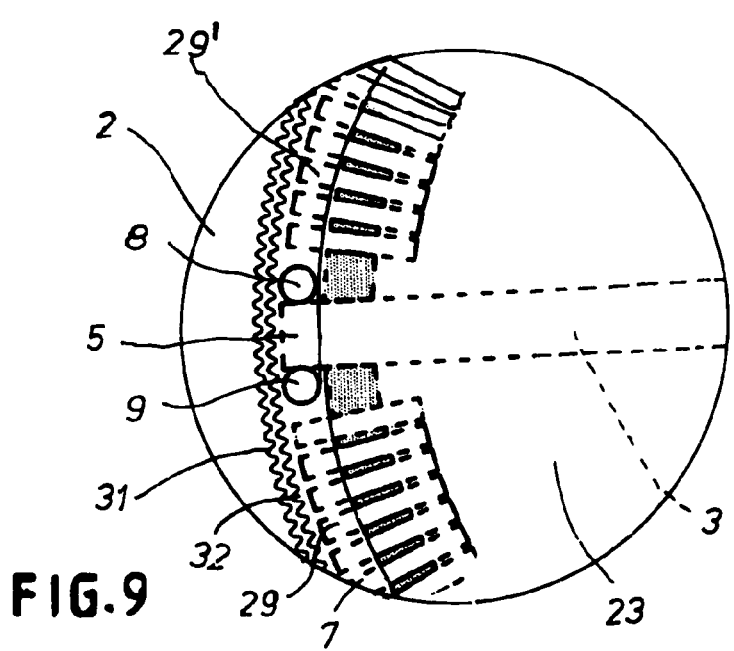
FIG. 9 shows an enlarged section from FIG. 8.

As is shown by FIGS. 8 and 9, the piezo motor according to the system described herein can also operate as a micro servo motor if the annular face 6 of the rotor 2 and the driver jaw 7 have toothings 31 and 32 which engage one in the other during the pressing on of the driver jaw 7. The pitch of this toothing corresponds here to a deflection 30 of the drive finger 3.

The piezo motor according to the system described herein is illustrated and described with a rotor 2 which surrounds the stator 1. However, in a kinematic reversal the stator can also surround the rotor or be arranged next to a rotor, and the drive finger and the driver jaws act on a cylindrical annular face of the rotor. This embodiment of a piezo motor is not as compact as the piezo motor which is described and illustrated and the structural complexity is greater.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

The invention claimed is:

1. A piezo motor, comprising:
   a stator;
   a rotor; and
   at least one drive finger which is held by the stator, drives the rotor and interacts with at least one piezo element, wherein the drive finger moves, with a free end of the drive finger, a driver jaw which can be pressed against an annular face of the rotor, wherein the free end of the drive finger is held in a radially displaceable fashion between two stops of the driver jaw, and wherein, during a drive movement of the drive finger, the driver jaw can be pressed against the rotor by at least one piezo actuator in time with the drive movement of the drive finger, and can be pivoted in the drive direction and back about a rotor axis, together with the piezo actuator, in accordance with a magnitude of a deflection of the drive finger.

2. The piezo motor as claimed in claim 1, wherein the free end of the drive finger is held between the stops of the driver jaw so as to be displaceable at a right angle to the drive direction.

3. The piezo motor as claimed in claim 1, wherein the drive finger is non-rotatably held with a fixed end of the drive finger in the stator, wherein the drive finger can be bent toward at least one side in the drive direction, and wherein the drive finger is composed of an elastic material which serves as a resetting spring.

4. The piezo motor as claimed in claim 1, wherein the drive finger is coated with piezo crystals on one side or on both sides.

5. The piezo motor as claimed in claim 1, wherein the drive finger is a resonator.

6. The piezo motor as claimed in claim 1, wherein the drive finger is mounted with a fixed end of the drive finger so as to be pivotable about an axis of the rotor, wherein the drive finger can be driven in the drive direction by a piezo stack actuator, and wherein the drive finger can be reset into the home position by a resetting spring or a further piezo stack actuator.

7. The piezo motor as claimed in claim 1, wherein the driver jaw is a first driver jaw and is connected to at least one further driver jaw which is arranged on the opposite side of the first driver jaw, and wherein the two driver jaws can be pressed against the annular face of the rotor by the piezo actuator which is supported against both driver jaws and can change in length.

8. The piezo motor as claimed in claim 7, wherein more than two driver jaws are connected to the first driver jaw and can be pressed against the annular face of the rotor by a circular piezo curving disk.

9. The piezo motor as claimed in claim 8, wherein the piezo curving disk is connected in one piece to the driver jaws.

10. The piezo motor as claimed in claim 1, wherein the drive finger is a first drive finger, and wherein a second drive finger acts on the rotor with a same frequency as the first drive finger but offset by half a wavelength or phase, wherein the second drive finger also moves, with a free end of the second drive finger, a second driver jaw which can be pressed against the rotor, wherein the free end of the second drive finger is held in a radially displaceable fashion between two stops of the second driver jaw, and wherein, during the drive movement of the second drive finger, the second driver jaw can be pressed against the rotor by the at least one piezo actuator in time with a drive movement of the second drive finger and can be pivoted, together with the piezo actuator, about the rotor axis.

11. The piezo motor as claimed in claim 10, wherein the stator is arranged between the two drive fingers, and wherein the drive fingers are held with their fixed ends on both sides of the stator.

12. The piezo motor as claimed in claim 1, wherein n drive fingers, n being at least three, and n driver jaws act on the rotor with the same frequency but each offset by a 1/n wavelength or phase.

13. The piezo motor as claimed in claim 1, wherein the driver jaw has a contact face which extends over at least ⅛ of the hollow-cylindrical annular face of the rotor and, in the case of abutment, comes into frictional contact with the annular face.

14. The piezo motor as claimed in claim 1, wherein the driver jaw has a toothing which comes into engagement with a toothing of the rotor when the driver jaw presses against the rotor.

15. The piezo motor as claimed in claim 14, wherein a pitch of the toothing of the rotor and of the toothing of the driver jaw corresponds to the magnitude of the deflection of the drive finger.

16. A piezo motor, comprising:
a stator;
a rotor;
a piezo actuator;
a driver jaw; and
a drive finger which is held by the stator and drives the rotor, wherein the drive finger moves, with a free end of the drive finger, the driver jaw, wherein the free end of the drive finger is held in a radially displaceable fashion between two stops of the driver jaw, and wherein, during a drive movement of the drive finger, the driver jaw is pressed against an annular face of the rotor by the piezo actuator in time with the drive movement of the drive finger, and is pivoted about a rotor axis, together with the piezo actuator, in accordance with a magnitude of a deflection of the drive finger.

17. The piezo motor as claimed in claim 16, wherein the driver jaw is a first driver jaw and is connected to a second driver jaw which is arranged on the opposite side of the first driver jaw, and wherein the two driver jaws are pressed against the annular face of the rotor by the piezo actuator which is supported against both driver jaws.

18. The piezo motor as claimed in claim 17, wherein the drive finger is a first drive finger, wherein a second drive finger acts on the rotor with a same frequency as the first drive finger but offset by half a wavelength or phase, wherein the second drive finger also moves, with a free end of the second drive finger, the second driver jaw, wherein the free end of the second drive finger is held in a radially displaceable fashion between two stops of the second driver jaw, and wherein, during a drive movement of the second drive finger, the second driver jaw is pressed against the rotor by the piezo actuator in time with a drive movement of the second drive finger and is pivoted, together with the piezo actuator, about the rotor axis.

19. The piezo motor as claimed in claim 18, wherein n drive fingers, n being at least three, and n driver jaws act on the rotor with the same frequency but each offset by a 1/n wavelength or phase.

20. The piezo motor as claimed in claim 16, wherein the driver jaw has a toothing which comes into engagement with a toothing of the rotor when the driver jaw presses against the rotor, and wherein a pitch of the toothing of the rotor and of the toothing of the driver jaw correspond to the magnitude of the deflection of the drive finger.

* * * * *